(12) United States Patent
Haridas et al.

(10) Patent No.: US 12,282,313 B2
(45) Date of Patent: Apr. 22, 2025

(54) MODULAR CONTROL NETWORK ARCHITECTURE

(71) Applicant: Honeywell International Inc., Charlotte, NC (US)

(72) Inventors: Harshal S. Haridas, Jamison, PA (US); Angela Lee Lordi, Landsdale, PA (US)

(73) Assignee: Honeywell International Inc., Charlotte, NC (US)

( * ) Notice: Subject to any disclaimer, the term of this patent is extended or adjusted under 35 U.S.C. 154(b) by 484 days.

(21) Appl. No.: 17/678,976

(22) Filed: Feb. 23, 2022

(65) Prior Publication Data

US 2023/0266748 A1 Aug. 24, 2023

(51) Int. Cl.
*G05B 19/41* (2006.01)
*G05B 19/418* (2006.01)

(52) U.S. Cl.
CPC . *G05B 19/41855* (2013.01); *G05B 19/41835* (2013.01); *G05B 2219/21015* (2013.01);
(Continued)

(58) Field of Classification Search
CPC ........ G05B 19/41855; G05B 19/41835; G05B 2219/21015; G05B 2219/21098;
(Continued)

(56) References Cited

U.S. PATENT DOCUMENTS 9,217,998 B2 12/2015 Plache et al.
2004/0117476 A1* 6/2004 Steele ................... G06F 9/5083
709/224

(Continued)

FOREIGN PATENT DOCUMENTS

EP 2866407 A1 4/2015

OTHER PUBLICATIONS

Modular Architecture for Industrial Automation, Vakkalagadda Prasad, Madayaswanth Manikanta, M.V.D. Prasad; International Journal of Engineering and Advanced Technology (IJEAT); ISSN: 2249-8958, vol. 2 Issue-3, Feb. 2013.
(Continued)

*Primary Examiner* — Christopher W Carter
(74) *Attorney, Agent, or Firm* — Paschall & Associates, LLC; James C. Paschall; Anthony Miologos

(57) ABSTRACT

An apparatus and system is disclosed connected to at least one input/output (I/O) module and to at least one controller of an industrial distributed control system. The apparatus and system comprises a control network module having a control component that uses a processor to execute operating software that implements operating configurations for the control network module. At least one I/O port is connected to the control component that is configurable by the operating software to enable port configurations to connect the at least one I/O module to the control network module. An expansion component connected to the control component has at least one expansion port connected to the at least one controller. The expansion port connects the at least one controller to the control component for communicating data and control signals to and from the at least one controller to the at least one I/O module. A security component regulates access to the apparatus based upon one or more security attributes.

19 Claims, 7 Drawing Sheets

(52) U.S. Cl.
CPC .............. *G05B 2219/21098* (2013.01); *G05B 2219/25174* (2013.01); *G05B 2219/25339* (2013.01); *G05B 2219/25428* (2013.01)

(58) Field of Classification Search
CPC ........... G05B 2219/25174; G05B 2219/25339; G05B 2219/25428; G05B 19/054; G05B 19/0423; G05B 19/4185; G05B 2219/33139
See application file for complete search history.

(56) References Cited

U.S. PATENT DOCUMENTS

| | | | |
|---|---|---|---|
| 2004/0153171 A1 | 8/2004 | Brandt et al. | |
| 2004/0162996 A1 | 8/2004 | Wallace et al. | |
| 2004/0255202 A1* | 12/2004 | Wong | H04L 41/0663 714/E11.023 |
| 2019/0042741 A1* | 2/2019 | Abodunrin | G06F 13/4068 |
| 2019/0384249 A1 | 12/2019 | Gopisetti et al. | |

OTHER PUBLICATIONS

A Flexible Architecture for Industrial Control System Honeypots, Alexander Vlad Serbanescu, Sebastian Obermeier, Der-Yeuan Yi, KPMG AG, ABB Corporate Research, Department of Computer Science, ETH, Zurich, Switzerland, 2015.

European Search Report for corresponding EP Application No. 23154931.2 dated Jun. 22, 2023.

\* cited by examiner

MODULAR CONTROL NETWORK ARCHITECTURE

TECHNICAL FIELD

This disclosure is generally directed to industrial control systems. More specifically, it relates to a modular control network architecture for an industrial distributed control system.

BACKGROUND

Industrial process control and automation system deployments across geographies are governed by several factors such as distance, functionality, and environment. A distributed system architecture allows an industrial distributed control system (DCS) to be both scaled out and distributed over long distances. As a result, network equipment that comprise data and control networks between assets of the DCS such for example Ethernet switches, routers, node interfaces, gateways, firewalls and network cabling become key components of the DCS. The various network interconnection components used to connect the assets of the DCS support capabilities for transmitting and receiving data and control signals using various transmission protocols such as for example Ethernet, serial or wireless. Further, the network is interconnected using network cables comprised for example of bundled copper wires or fiber optic wires cables that interconnect the DCS assets and network components in for example in a ring, a star or mesh network topologies or in combinations of wired and wireless networks to achieve the required inter-connectivity between the distributed DCS assets.

In addition to above mentioned network functions, security and protection of the data and control signals communicated between the network components as well as the assets of the DCS is another important function. Various remote applications or systems often attempt to update and/or acquire information or related device information via a plurality of different, competing and often incompatible or insecure network technologies. A major concern with this type of access to the DCS in general, relates to the amount of security that is provided when sending or receiving data to and from the assets of the associated DCS equipment. In most factories or industrial environments, complex and sometimes dangerous operations are performed in a given manufacturing setting. Thus, if a network-connected controller for example were inadvertently accessed, or even worse, intentional sabotage were to occur by a rogue machine or individual, potentially harmful results can occur. Therefore, most currently known DCS deployments offer capabilities such as hardware and software firewalls that not only protect connections between different vendor networks but also functionality that restricts a certain nature of traffic that is being passed by the network of the DCS.

The plethora of network functions of the DCS described earlier are traditionally manufactured into separate hardware network components. This leads to an explosion of device stock-keeping units (SKUs) eventually resulting in inefficient operations and high costs to support and maintain the hardware network deployments. Through the years, advances in networking to improve scalability have somewhat alleviated above mentioned problem by providing expansion capabilities. However, such expansion capabilities continue to address a small set of functions such as for example, the switching or routing of data without the availability of both capabilities bundled together. Other advances include spine-leaf architectures that are popular in a data center. However, these architectures are not relevant for DCS deployments due to the large number of interconnections required between the leaf and spine components in a geographically distributed DCS.

SUMMARY

This disclosure relates to a modular control network architecture for an industrial distributed control system.

In a first embodiment an apparatus is disclosed connected to at least one input/output (I/O) module and to at least one controller of an industrial distributed control system. The apparatus comprises a control component including a processor that executes operating software that implements operating configurations for the apparatus. At least one I/O port is connected to the control component and configurable by the operating software to enable port configurations to connect the at least one I/O module to the apparatus. An expansion component is connected to the control component and has at least one expansion port connected to the at least one controller. The expansion port connects the at least one controller to the control component for communicating data and control signals to and from the at least one controller to the at least one I/O module. A security component regulates access to the apparatus based upon one or more security attributes.

In a second embodiment a system is disclosed connected to least one input/output (I/O) module and to at least one controller of an industrial distributed control system. The system includes a first control network module comprising a control component including a processor that executes operating software that implements operating configurations for the first control network module. The system further includes at least one I/O port connected to the control component. The at least one I/O port is configurable by the operating software to enable port configurations for connecting the at least one I/O module to the first control network module. An expansion component is connected to the control component and to at least one expansion port that is connected to the at least one controller, the expansion port connecting the at least one controller to the control component for communicating data and control signals to and from the at least one controller to the at least one I/O module. The system additionally includes a configuration component for communicating I/O port configurations to the operating software of the control component and a security component for regulating access to the first control module based upon one or more security attributes.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Industrial automation is an important feature of today's industrial processing plants. There is a need for industrial process control and automation systems to continually provide greater flexibility in the implantation and operation of the industrial automation systems. In particular in complex DCS deployments network interconnections between the various assets and components of the DCS become problematic, for example, the large number of unmanaged Ethernet switch SKUs increases complexity and does not provide for loop detection due to the lack of spanning tree detection methods. The fixed port speeds of an unmanaged Ethernet switch results in the selection and use of different Ethernet switches to provide the network speeds required in the network deployment. More importantly Ethernet switches lack security or firewall features since all ports are open. The Ethernet network as well as its assets are susceptible to malicious intrusions by third parties. Additionally, switches have little to no troubleshooting or upgrading opportunities and rely on $3^{rd}$ part vendor replacements of the switch for update. As can be appreciated the network complexity can cause inadvertent misconfigurations of an Ethernet network leading to deployment failures. By providing a module designed to support several network functions, the SKU explosion and lack of security in a highly distributed and complex DCS can be avoided.

Figure 1:
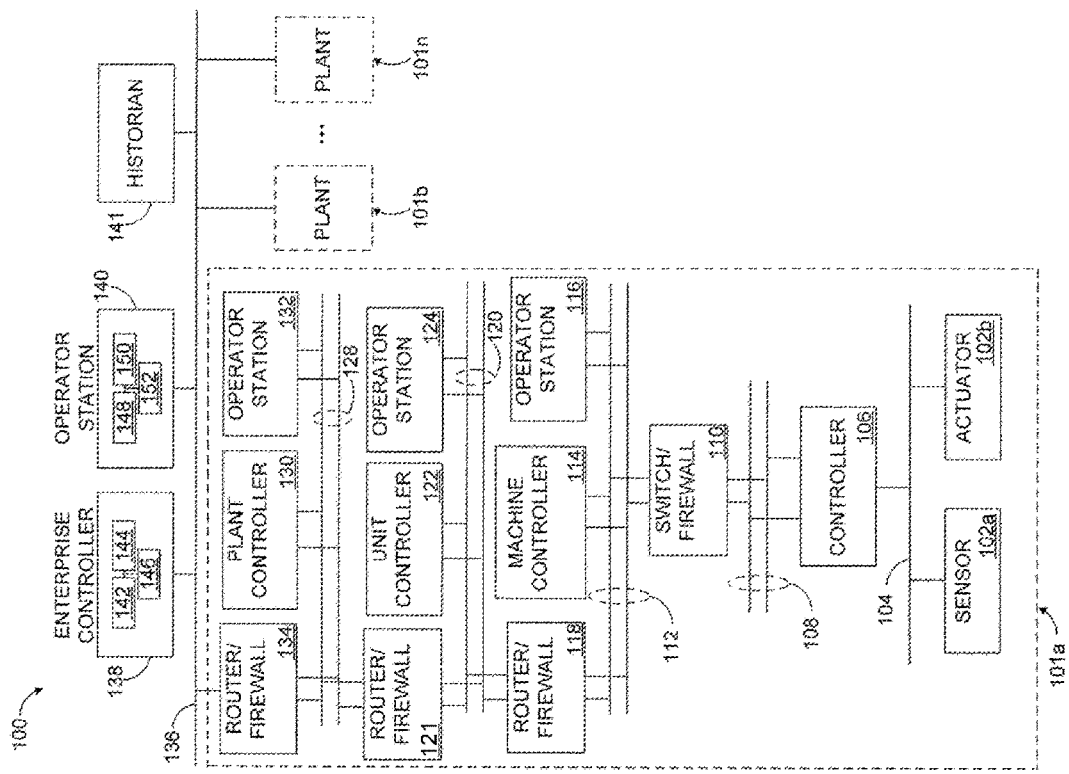
FIG. 1 illustrates an exemplary industrial process control and automation system.

FIG. 1 illustrates an example DCS 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system. The sensors and actuators may be generally referred to as field devices or process instruments.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical serial network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102*a*, and actuators 102*b*, which could be associated with a particular piece of industrial equipment (such as a boiler or other machine). For example, the machine-level controllers 114 could log information collected or generated by the controllers 106, such as measurement data from the sensors 102*a* or control signals for the actuators 102 *b*. The machine-level controllers 114 could also execute applications that control the operation of the controllers 106, thereby controlling the operation of the actuators 102 *b*. In addition, the machine-level controllers 114 could provide secure access to the controllers 106. Each of the machine-level controllers 114 includes any suitable structure for providing access to, control of or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102*a*, and actuators 102*b*).

One or more operator stations 116 are coupled to the networks 112. The operator stations 116 represent computing or communication devices providing user access to the machine-level controllers 114, which could then provide user access to the controllers 106 (and possibly the sensors 102*a* and actuators 102*b*). As particular examples, the operator stations 116 could allow users to review the operational history of the sensors 102*a* and actuators 102*b* using information collected by the controllers 106 and/or the machine-level controllers 114. The operator stations 116 could also allow the users to adjust the operation of the sensors 102*a*, actuators 102*b*, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable, networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102*a*, and actuators 102*b*).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 121 couples the networks 120 to two networks 128. The router/firewall 121 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101*a*-101*n*, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101*a*-101*n* and to control various aspects of the plants 101*a*-101*n*. The enterprise-level controllers 138 can also perform various functions to support the operation and control of components in the plants 101*a*-101*n*. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101*a* is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100. In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142.

Each of the controllers could also include at least one network interface 146, such as one or more Ethernet interfaces and or Ethernet switches or wireless transceivers and routers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces and or Ethernet switches or wireless transceivers.

Figure 2:
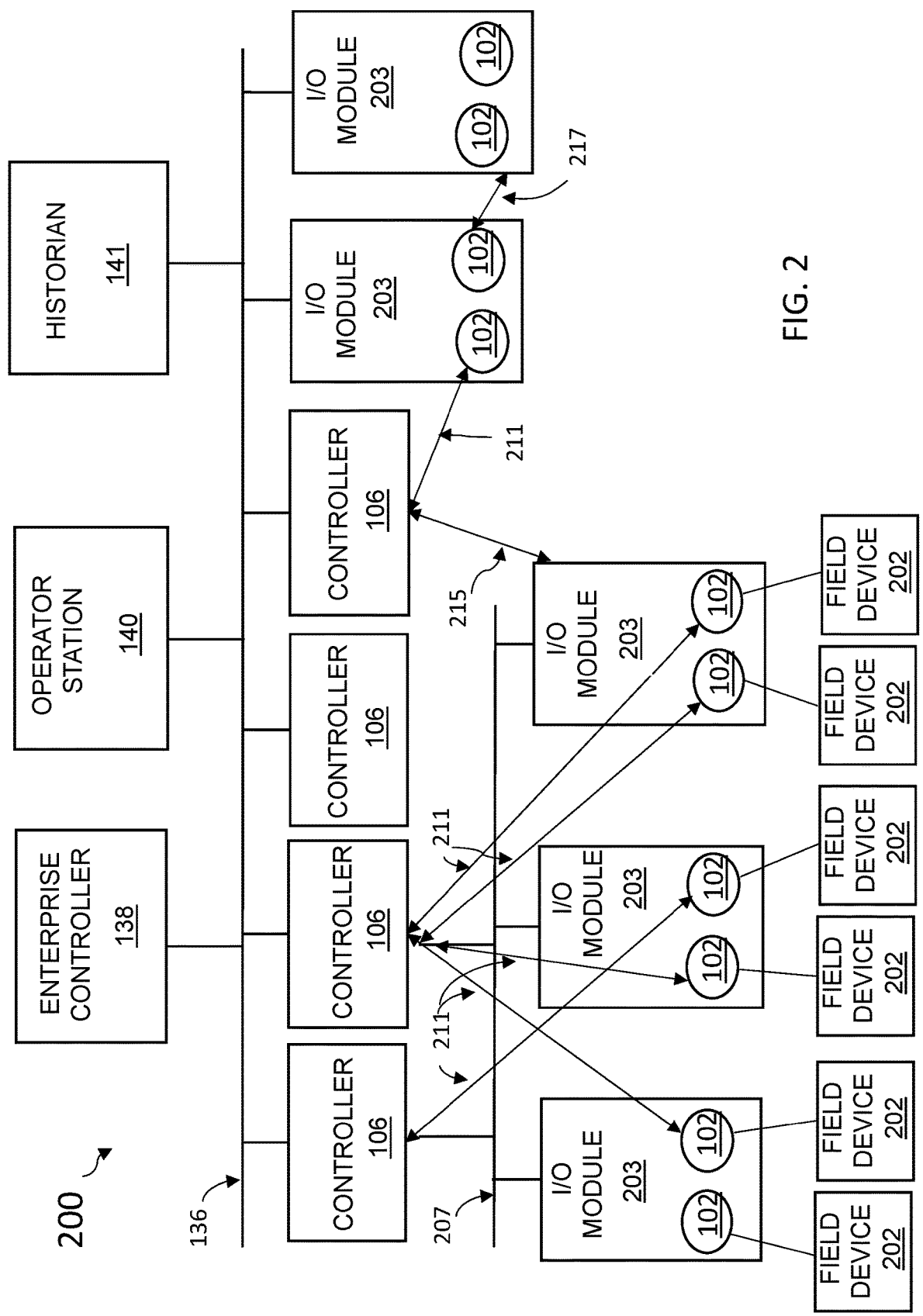
FIG. 2 illustrates an exemplary control node using mesh topology at the channel level of the I/O modules.

In some industrial distributed control systems, a mesh topology may be employed at the channel level of the I/O modules. An exemplary mesh topology at the channel level of the I/O modules is shown in FIG. 2. Enterprise controller 138, operator station 140, historian 141, network 136, and controllers 106 are as described above with reference to FIG. 1. I/O modules 203 have multiple channels 102 which are connected to field devices 102*a* and 102*b* of FIG. 1. For simplicity, in FIG. 2, I/O interfaces are not shown as separate from the I/O modules but shown as a unit. An I/O network 207 is shown in addition to network 136. I/O network 207 is a private network. A number of controllers 203 are connected to I/O network 207, while other controllers 203 are connected to network 136.

Typically, field devices allow for monitoring manufacturing processes, such as physical attributes, such as temperatures, pressures, flows, etc., as well as providing control over a process, such as opening/closing valves, increasing/relieving pressures, turning up/down heating or cooling units, etc. There is a need to centralize control and information gathering to improve plant efficiency. Each process in the plant has one or more input characteristics, i.e., control features, and one or more output characteristics, i.e., process conditions.

An automation system that uses a DCS has its system of sensors, controllers and associated computers distributed throughout an industrial plant. DCS systems use methods such as publish/subscribe and request/response to move data from controllers to client servers and applications at a supervisory level. The DCS provides automated decisions based on processing the data in real time or as modified by users in response to analysis of data collected from running processes.

In DCS systems, each controller may be assigned to a specific input/output module and the set of channels and field devices associated with the specific input/output module. Sets of channels and associated field devices are fixed by the I/O module's type, the physical location of the I/O module, or the network location of the I/O module. Flexibility is therefore limited. However, in current mesh topology networks the relationship between one controller and a set of I/O channels is no longer a bound relationship of one controller to a specific set of I/O channels defined by one I/O module, but instead shows the I/O channels of multiple I/O modules to be meshed to a set of control nodes, i.e., controllers.

The I/O electronics have been decoupled from one specific controller. Specifically, FIG. 2 shows the I/O modules each having a plurality of channels at a channel level of the I/O module, where the channels of all the I/O modules are connected in a mesh topology. In FIG. 2, not only have the I/O electronics been decoupled from one specific controller, but with the mesh topology at the channel level of the I/O modules, multiple controllers may be related to a single I/O module and the channels within. Each of the multiple of controllers may be connected to one or more channels of a single I/O module.

The I/O mesh is particularly valuable for engineering efficiency when Universal I/O Modules available from Honeywell Process Solutions are employed. Using technology such as that of the Universal I/O Modules, channel types are software configured. The types available to choose from include analog input, analog output, digital input, and digital output.

Multiple advantages are achieved by employing a mesh topology to the channels of the I/O modules. I/O modules may be located geographically close to the field devices without regard to which specific controller will use those I/O signals and equipment. This advantage supports the current need to simplify designs by removing field junction boxes and deploying more I/O in the field as compared to traditional Control Center and remote instrument enclosure (RIE) deployments.

Another advantage is the ability to use standard Ethernet as a remoting medium, including switched and ring topologies. Employing standard Ethernet technology may allow for greater flexibility, greater stability and reliability, greater security, greater scalability. Further Ethernet connections provide for higher security at the I/O level and is ISA99 certified. However, the disclosure is not limited to Ethernet technology.

At a high-level view, FIG. 2 comprises a system 200 that includes a plurality of I/O modules 203 wherein each I/O module is connected to a plurality of field devices 202 though channels 102 of the I/O modules 203. A channel provides one datum of an industrial process. Process data from field devices or process control strategy instructions to field devices are referred to herein as channels. Channels 102 are configured in a mesh topology. FIG. 2. Shows representative field devices 202 although each I/O module 203 may be connected through channels 102 to a plurality of field devices 202 even if not shown. Hundreds of field devices 202 may be connected to I/O module 203 through channels 102. Field devices 202, are devices for generating process information, or for actuating process units through control of valves, regulators, or other processing devices. Exemplary field devices 202 can be sensors, actuators, or other processing devices, such as valves, flow controllers and other equipment. The mesh topology allows for signals to and from the channels, and therefore to and from the field devices, to reach a necessary controller regardless of the I/O module a channel is associated with. Multiple controllers may be controlling outputs of different channels that belong to the same I/O module. Similarly, Multiple controllers may be controlling inputs of different channels that belong to the same I/O module. Connections may be though, for example, Ethernet technology or wireless technology.

System 200 further includes a plurality of controllers 106. Each controller 106 is configured to receive signals from and transmit signals to any one of the plurality of channels 102 within the plurality of I/O modules 203, wherein the channels 102 are connected in a mesh topology. Just as each channel 102 represents a datum of a process, that datum is destined for a specific controller 106. With the channels 102 configured in a mesh topology, the specific datum in a specific channel can be connected to the proper specific controller 106 regardless of which I/O module the channel resides in. In other words, data collected from field devices via channels is available to any controller though the mesh topology of the channels. Similarly, signals or instructions from the controller may be available to any channel though the mesh topology of the channels.

Each controller 106 generates an information stream for further processing. In some embodiments the controllers 106 may be arranged with electronic interconnection topologies, such as through Ethernet technology. Suitable topologies include, but are not limited to, a ring topology and a star topology. The ring topology comprises an interconnection of the controllers wherein each controller is in communication with two other controllers. A star topology is wherein one or more controllers are interconnected with the remaining controllers. When employing these topologies, it is not required for each controller to be interconnected to all other controllers. In one embodiment each controller is connected to at least one or two other controllers. Using controller topologies such as these, controllers can also share information between each other. Exemplary controllers include an application control system, a field device manager, a remote terminal unit, embedded controllers, programmable logic controllers, virtual nodes, or another device for receiving information and sending instructions to a field device 202. The controller 106 can be operated through a human machine interface, or through a pre-programmed automated system.

System 200 further includes network 136, which can be a supervisory control network, for directing information streams to and from the controllers 106. Network 136 receives the information stream from the controllers 106 and transmits control strategy information to the controllers 106. When a requesting node needs a datum from a responding node, it issues a request for the datum across the network and the responding node then returns the datum back across the network. Network 136 as a supervisory control network comprises a supervisory control computer and interfacing hardware to enable communication and control between a client server and the industrial plant.

System 200 can further include a data center housing enterprise controller 138, operator station 140, and/or historian 141 for receiving and storing the information stream from the network 136. Sorted data can be later retrieved for analysis. Data storage can be a local storage, a remote storage, or a cloud storage.

With the mesh topology of the channels of the I/O modules, FIG. 2 shows connections between controllers 106 and the channels 102 of I/O modules 203 may occur in multiple different ways. For example, connections 211 show controllers 106 connected to different channels 102 of different I/O modules 203. One controller 106 may be connected to multiple channels 102 within the same I/O module 203. I/O modules interface I/O to the system over a network. The network may be, for example, a supervisory network or a private I/O network. A controller connected to network 136 may be connected to a channel 102 of an I/O module also connected to network 136. A controller connected to network 136 may be connected to a channel 102 of an I/O module connected to I/O network 207 via connection 215.

Large Ethernet deployments can require a large number of managed Ethernet switch configuration, particularly in DCS systems employing Fault Tolerant Ethernet (FTE) redundant network configurations. For example, in a DCS systems employing 150 FTE nodes, 8 pairs of Ethernet switches using 330 ports would be needed to interconnect the 150 FTE nodes. This includes an FTE network composed of 165 primary and 165 secondary switched pairs. Additionally, it is not uncommon in industrial plants to have several pairs of Ethernet or fiber cabling between 100 meters to 10 kilometers in length used in the interconnection of the various nodes of the DCS. This interconnection burden in plant equipment such as unmanaged network switches and cabling becomes even greater in mesh topology networks where the relationship between one controller and a set of I/O channels is no longer a bound relationship of one controller to a specific set of I/O channels defined by one I/O module, but instead shows the I/O channels of multiple I/O modules to be meshed to a set of control nodes, i.e., controllers.

Figure 3:
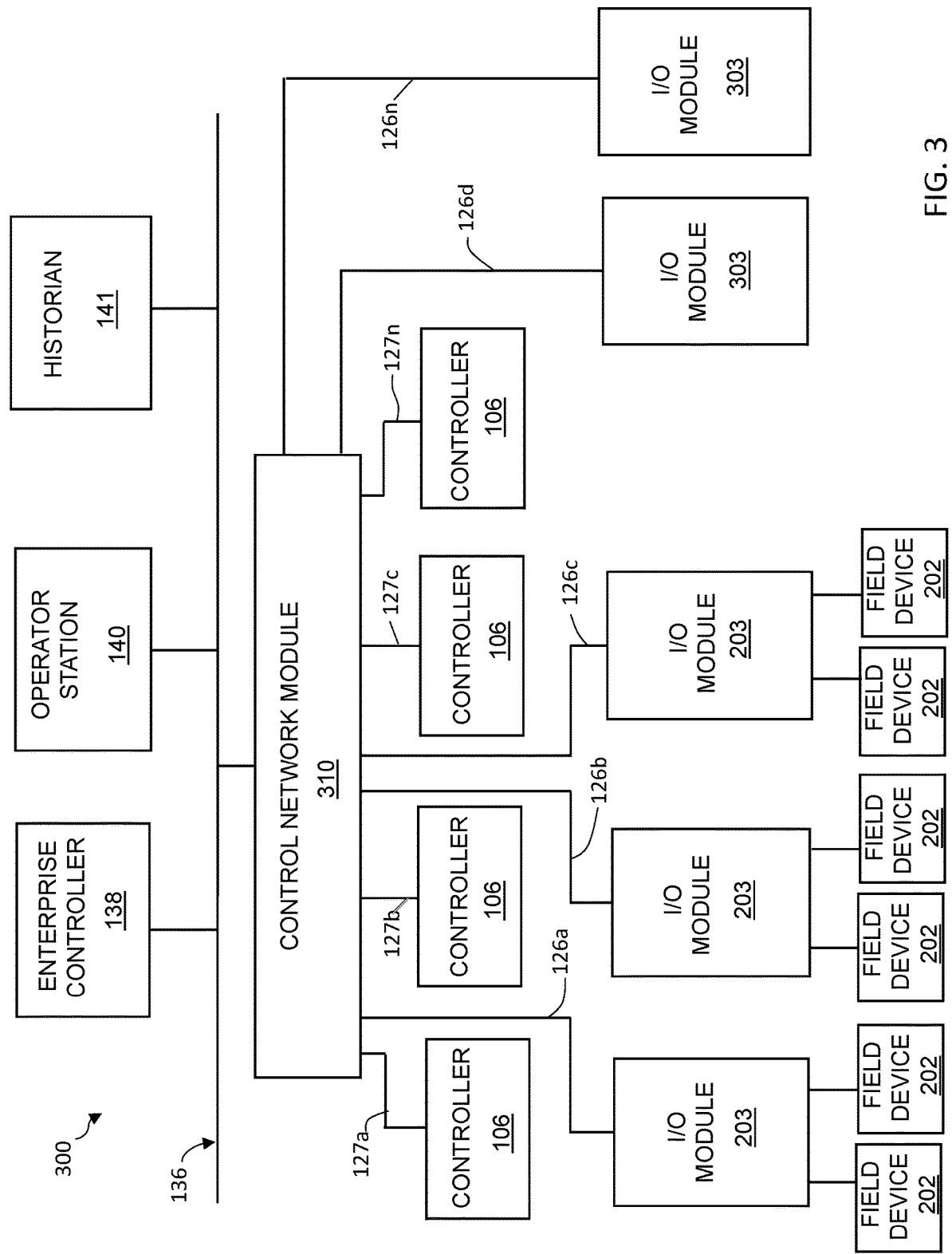
FIG. 3 illustrates the exemplary control node of FIG. 2 using the modular control network architecture in accordance with the present invention.

FIG. 3 illustrates schematically a modular system architecture that helps achieve several functions while reducing complexity during DCS network deployments. The Ethernet network 207 of FIG. 2 has been replaced by a control network module 310 that includes several key architectural building blocks. These include built-in security, including signed firmware and deep packet inspection protocols. A common platform configuration architecture operates a connectivity component that can configure and operate a plurality of wired or fiber network ports for the interconnection to devices and I/O modules and to supervisory networks. A mode selection feature allows a user to select default network port configurations based on the application of the control node. A built-in hardware Ethernet switch provides an expansion capability to provide network connectivity to other controllers or expansion to other control nodes. The control network module 310 also includes a configuration component that allows a user to easily access and configure new network port functions and easily introduce the new connection functions into the network serviced by the control network module.

The control network module 310 can be configured as single I/O termination assembly (IOTA) module or interconnected with another control network module 310 via a backplane of an equipment cabinet or frame or connected together using a data and a control cable to provide an active system IOTA that can easily interconnect multiple controllers 106 or I/O modules 203. The control network module 310 can also be interconnected in other multiple configurations, such as for example active-passive system (IOTA) deployment shown in FIG. 6 and an active-active system independent (IOTA) deployment as shown in FIG. 7. These various deployments will be explained in more detail below.

Figure 4:
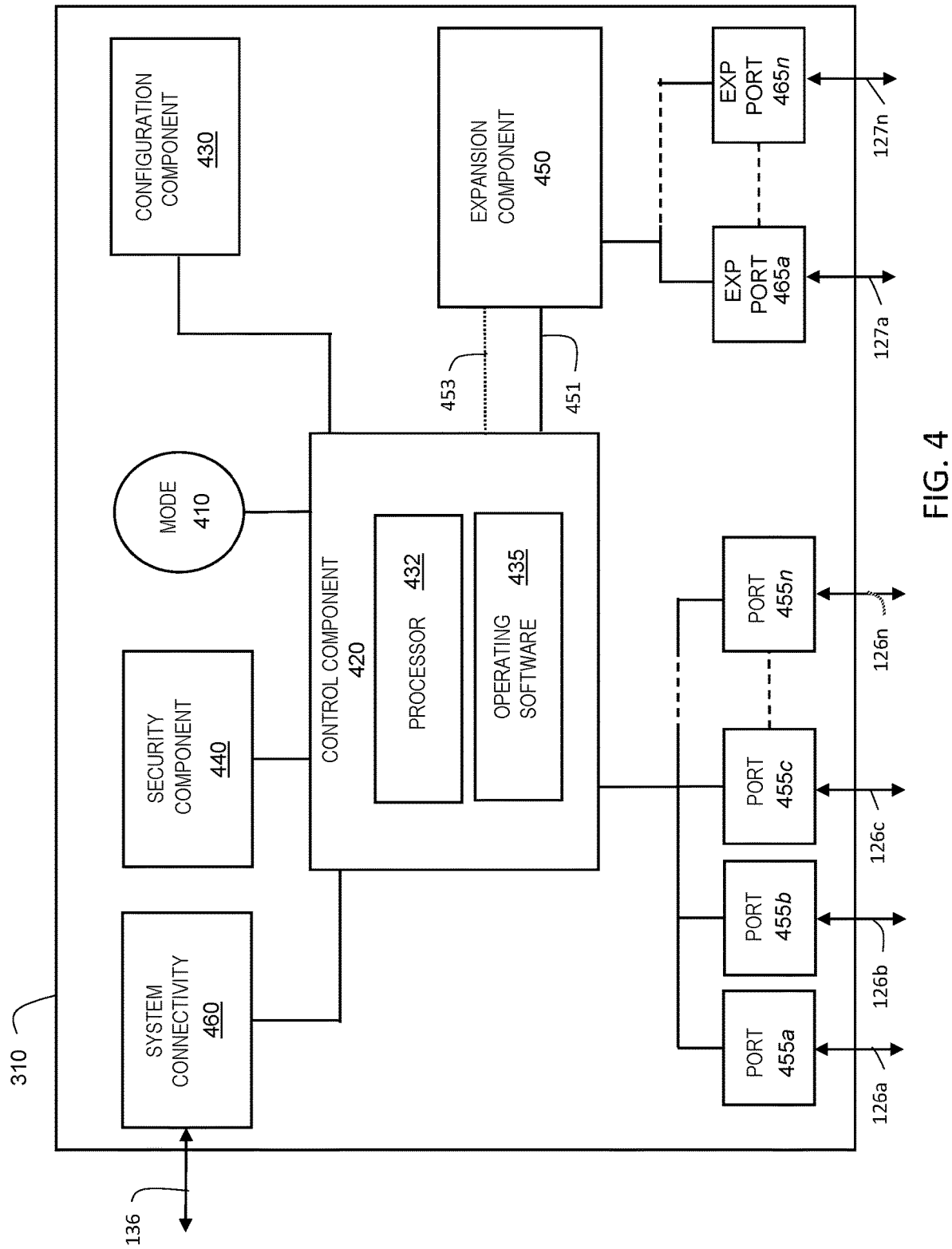
FIG. 4 illustrates schematically the control network module in accordance with the present invention.

FIG. 4 illustrates schematically the components of the control network module 310. The control network module 310 includes a mode component 410, a control component 420, a configuration component 430, a security component 440, an expansion component 450 connected to a plurality of expansion ports 465*a-n*, a system connectivity port 460 and a plurality of I/O ports 455*a-n*.

The mode component 410 acts as rotary switch that allows a user to select and implement stored pre-programmed deployment functions of the operating software 435, such as for example, security policy and firewalls, virtual LAN (VLAN), and/or quality of service (QOS) networking. The control component 420 is responsible to execute the necessary function based on the mode component selection made by a user via the configuration component 430. A processor 432 executes operating software 435 that runs the programmed functions of the control network module 310.

The control network module 310 can also be programmed to execute customized network functions when used in conjunction with the configuration component 430. The configuration component 430 is comprised of configurable hardware and software that enables specialized custom port configurations to perform specialized network functions. The configuration component 430 provides an independent interface to the control component 420 to allow fast configuration and secure bootstrapping. For example, the configuration component 430 may include a Bluetooth or other wireless communication hardware module operating a two-way wireless software protocol for establishing two-way communication between the control network module 310 and a remotely located handheld device (not shown), such as a smartphone, a tablet or a laptop PC. A user using the handheld device can directly query port configuration settings of the I/O ports 455*a-n* and expansion ports 465*a-n* and set custom port settings such as for example, port speed, switched port analyzer (SPAN) and VLAN configurations.

The security component 440 includes both hardware and software applications providing one or more security attributes such as, for example, hardware authentication, firewalls, secure boot, signed firmware and deep packet inspection. The security component 440 is responsible to ensure authentication when the other components of the network module are connected to exterior sources. For example, the security component would provide a proper security authentication to external handheld devices connected or attempting to connect to the configuration module 430. Additionally, the security component monitors I/O ports 455*a-n* and expansion ports 465*a-n* to detect any changes at the ports. The security component 440 notifying the control component upon detection of an irregular condition. The control component may then send status messages to a supervising controller, such as enterprise controller 138 or to the operator station 140 through the system connectivity port 460 and network connection 136 of the detected irregular condition.

The expansion component 450 is a hardware Ethernet switch that provides a mechanism to horizontally scale and expand the port connections of the control network module 310. Data and control signals to and from controllers 106 are connected to the expansion component 450 via expansion ports 465*a-n* and cables 127*a-n* using a mix of copper or fiber cables, employing wired or wireless Ethernet or serial network protocols. A software defined internal network between the expansion component and expansion component separates data and control connections to a data plane connection 451 and a control plane connection 453. The control plane connection 453 is used to pass firmware updates, configuration data, such as for example port speed, SPAN and VLAN to the expansion component and expansion ports 465*a-n*. The control plane connection 453 is also used to send status messages from the expansion ports 465*a-n* to the control component 420 such as, for example, notifications to controller 136 or operator station 140 of the status and configuration of ports 465*a-n* as well as the operational status of the expansion component 450. Since the data plane connection 451 does not have the burden to also pass control signals between the control component 420 and expansion component 450, data signals travelling on the data plane connection 451 travel uninterrupted at high rates speeds than they would have if data signals were shared with control signals.

The control network module 310 is connected to I/O modules 203 and devices of a control node through a plurality of connectivity ports consisting of I/O ports 455*a-n* and to the supervisory layers of the DCS via system connectivity port 460. Ports 455*a-n* and system connectivity port 460 are connected to the control component 420. The system connectivity port 460 provides an "uplink" to the supervisory layers of the DCS via network connection 136 to provide notifications to the DCS of the status and or changes to the control network module 310. This may include for example, cable breaks or reconnects new device connections and disconnections, and any changes in port speed. Additionally, notifications to the DCS may be sent for attempts to connect unknown devices to I/O ports 455*a-n* as well as port shutdowns due to MAC flapping/loop situations, monitoring port drop rates and unusual traffic rates to a connected I/O module 203 or another connected device. Connections to/from I/O modules 203 are made using cables 126*a-n* to I/O ports 455*a-n* using a mix of copper or fiber cables, using wired or wireless Ethernet or serial network protocols based on the type of I/O modules 203 or other devices connected to the control node.

The control network module 310 described above and shown in FIG. 4 can be configured as a single I/O termination assembly (IOTA) module or interconnected with another control network module 310 via a backplane of an equipment cabinet or frame to provide an active system IOTA that can easily interconnect to multiple I/O modules 203 and controllers 106 in a DCS control node. Alternately, two network control modules 310 can be connected together using a data and control cabled connection.

Figure 5:
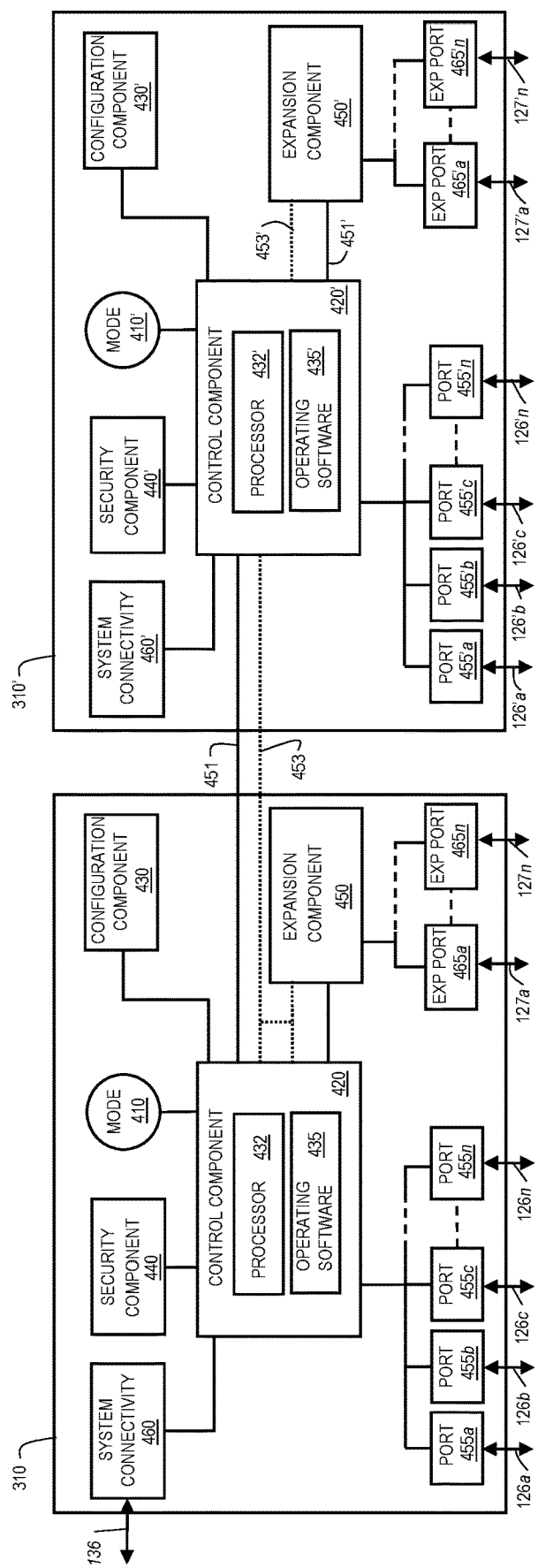
FIG. 5 illustrates schematically an active-to-active deployment of two interconnected control network modules in accordance with the present invention.

FIG. 5 illustrates schematically an active-to-active deployment of first and second interconnected control network modules 310, 310'. The first and second control network modules 310, 310' work in concert to provide network services across a larger network of I/O modules 203, devices and controllers 106 within a control node. In this active-to-active deployment control network modules 310, 310' operate to transmit and receive data and control signals between each control network module 310, 310' and the I/O modules 203, devices and controllers 106 connected to the individual I/O ports and expansion ports. Each control network module 310, 310' operating synchronously to provide similar network features for the node they are handling. Each control network module 310, 310' is interconnected using a data plane connection 451 and a control plane connection 453. Configuration and firmware updates, from the system connectivity component 460 of control network module 310 is also sent to the control component 420' of the control network module 310' via the control plane connection 453 for distribution and use by the components and ports of the control network module 310'. Therefore, only the system connectivity component 460 of the control network module 310 is used to connect the interconnected modules 310, 310' to the supervisory network 136. The control plane connection 453 is also used to send monitoring and reporting messaging from the I/O ports 455a-n of control network module 310, as well as the I/O ports 455'a-n of control network modules 310' to its respective control component 420, 420'. For example, notifications may be sent to controller 138 or to operator station 140 of the status and configuration of I/O ports 455a-n, 455'a-n as well as the operational status of the expansion component 450 and 450'.

Data to and from the connected I/O modules 203 and devices connected via I/O ports 455'a-n and cables 126'a-n as well as data and control signals to and from controllers 106 via expansion ports 465'a-n and cables 127'a-n are passed to the control components 420 of control network module 310 from control component 420' of control network module 310' using data plane connection 451. Since the data plane connection 451 does not have the burden to also pass control signals between the control component 420, 420' data signals travelling on the data plane connection 451 travel uninterrupted at high rates speeds than they would have if data signals were shared with the control signals.

Figure 6:
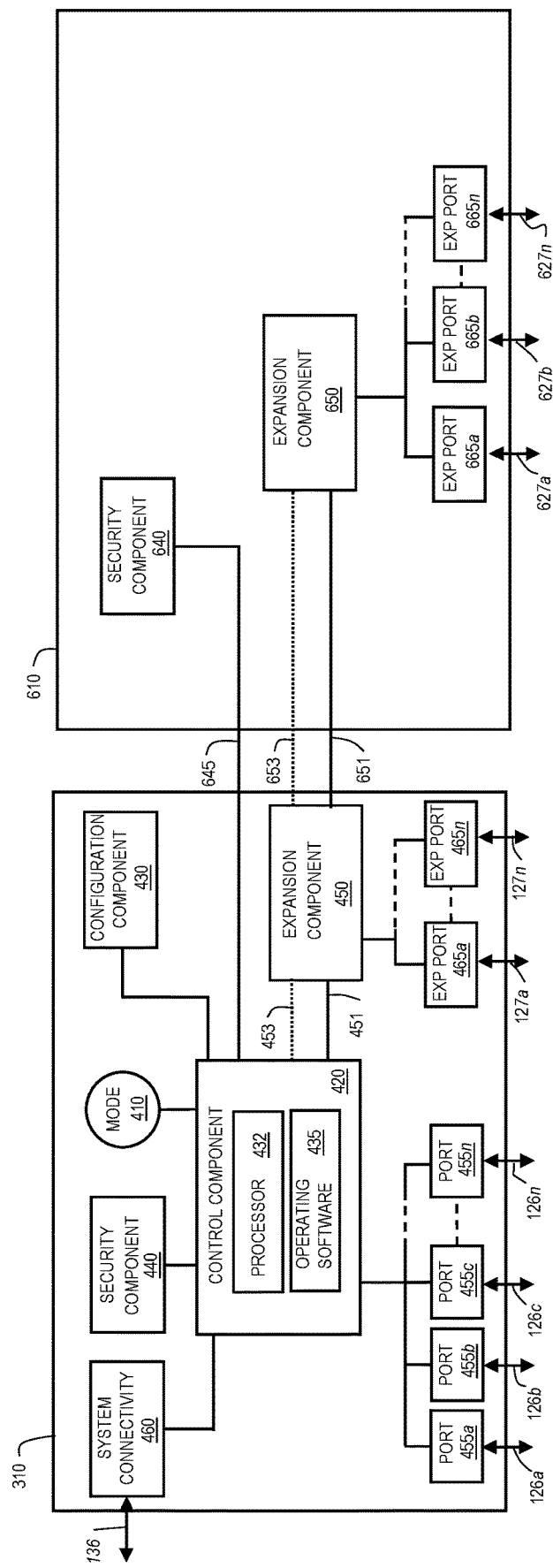
FIG. 6 illustrates schematically an active-to-passive deployment of two control network modules in accordance with the present invention.
Figure 7:
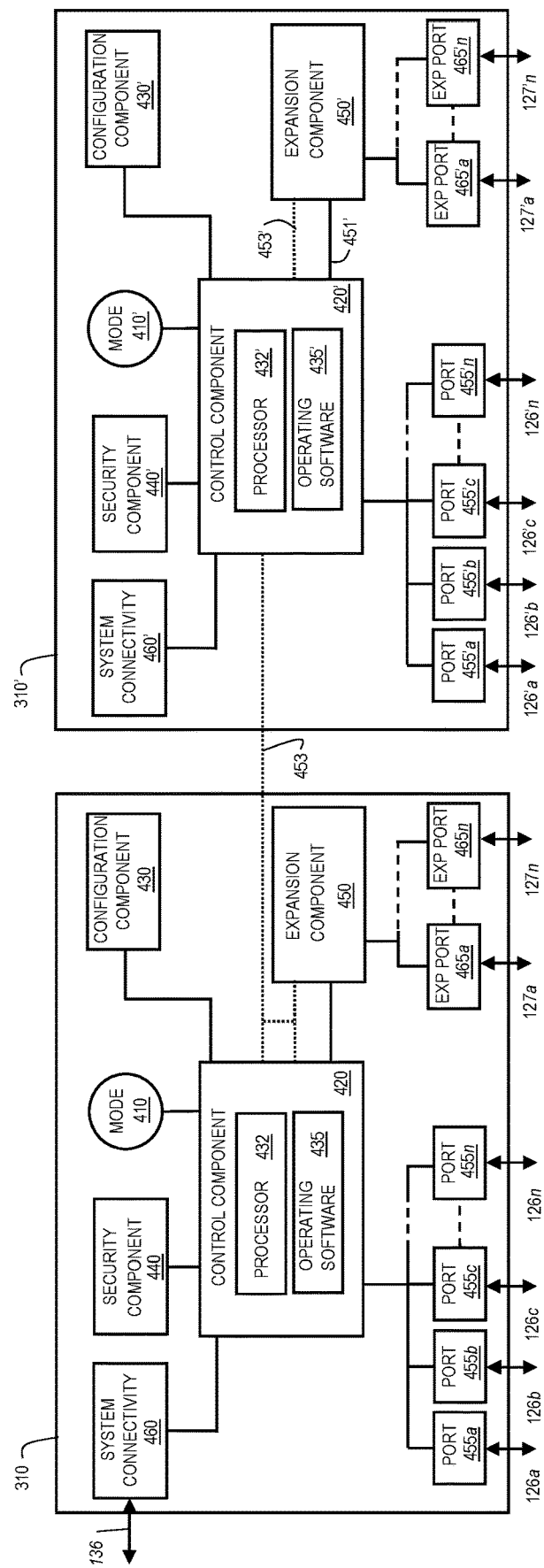
FIG. 7 illustrates schematically an active-to-active deployment of two control network modules each module operating independently of the other.

FIG. 6 illustrates schematically an active-to-passive deployment of two control network modules. In the active-passive deployment a first control network module 310 takes on the active role and a second expansion module 610 a passive role. In this pairing, module 610 includes an expansion component 650 connected to expansion ports 665a-n and a security component 640. This deployment pairing is typically used for scaling out or horizontally expanding a first control node to another local or remote DCS control node. The expansion ports 665a-n may be connected via cables 627a-n to other wired controllers 106 of a remote control node or to the gateways or routers of a wireless control node.

In this deployment the second expansion module 610 does not have a control component 420 to control the functions of module 610. The expansion component 450 of the active control network module 310, includes an expansion feature that allows the connection of the expansion component 450 of the active network control module 310 to transmit and receive control and data signals to the expansion component 650 via the data plane connection 651 and control plane connection 653. The included security component 640 in the expansion module 610 continues to function as an authentication agent and interacts directly with the control component 420 using connection 645 prior to enabling of the expansion function. It should be noted that expansion module 610 does not need to be a separately configured module having only the security component 640 and expansion component 650 and expansion ports 665a-n. The expansion module 610 can be configured using a control network module 310 and having its operating software 435 turn on and use only the security and expansion components of the control network module 310 required to provide the expansion features just described.

FIG. 7 illustrates schematically an active-to-active deployment of two control network module each module operating independently of the other. In this deployment pairing the control network modules 310, 310' are deployed unrelated to each other but side by side for several reasons such as to save space and/or to handle special remote situations. For example, control network module 310 handling a wired control node using an advanced software controller for providing predictive control of a plant operation while control network module 310' handles a wireless control node monitoring and controlling another industrial plant operation in the same plant or in a different industrial plant. In this deployment pairing, the control components 420, 420' interact passing only configuration and other control information to each other. Messaging and other notification as explained above could be passed from control component 420' to control component 420 via control plane connection 453. Notifications sent to a supervising controller such as controller 138 via network connection 136. The sharing of data between modules 310, 310' in this deployment pairing is not made to ensure a secure deployment of the two interconnected systems.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus connected to at least one input/output (I/O) module and to at least one controller of an industrial distributed control system comprising:

a control component including a processor that executes operating software that implements operating configurations for the apparatus;
at least one I/O port connected to the control component, the at least one I/O port configurable by the operating software to enable port configurations for connecting the at least one I/O module to the apparatus;
an expansion component connected to the control component having at least one expansion port connected to the at least one controller, the expansion port connecting the at least one controller to the control component for communicating data and control signals to and from the at least one controller to the at least one I/O module, wherein the control component is connected to the expansion component using a data plane connection and a separate control plane connection; and
a security component for regulating access to the apparatus based upon one or more security attributes.

2. The apparatus as claimed in claim 1, wherein the operating software includes a plurality of pre-programmed operating configurations, the apparatus further comprising:
a mode component for selecting one of the pre-programmed operating configurations.

3. The apparatus as claimed in claim 1, wherein the apparatus further comprises:
a system connectivity port connected to the control component, the system connectivity port connecting the control component to a supervising controller of the industrial distributed control system for communicating status notifications from the control component to the industrial distributed control system.

4. The apparatus as claimed in claim 1, wherein the at least one I/O port can be configured by the operating software to operate using wired or wireless Ethernet or serial network protocols.

5. The apparatus as claimed in claim 4, wherein the at least one I/O port can be connected to the at least one I/O module using a wire conductor cable or a fiber optic cable.

6. The apparatus as claimed in claim 3, wherein the industrial distributed control system includes an Ethernet supervisory network, the system connectivity port connecting the control component to the supervising controller via the Ethernet supervisory network.

7. The apparatus as claimed in claim 1, wherein the apparatus further comprises:
a configuration component for communicating I/O port configurations to the operating software of the control component.

8. The apparatus as claimed in claim 7, wherein the configuration component includes a wireless communication module that operates using a wireless communication protocol to receive I/O port configurations from the at least one I/O port and the at least one expansion port and to load port configurations to the operating software from a remotely located communication device.

9. The apparatus as claimed in claim 1, wherein data signals are passed between the expansion component and the control component along the data plane connection.

10. The apparatus as claimed in claim 1, wherein control signals are passed between the expansion component and the control component along the control plane connection.

11. A system connected to at least one input/output (I/O) module and to at least one controller of an industrial distributed control system, the system including a first control network module comprising:

a control component including a processor that executes operating software that implements operating configurations of the first control network module;
at least one I/O port connected to the control component, the at least one I/O port configurable by the operating software to enable port configurations for connecting the at least one I/O module to the first control network module;
an expansion component connected to the control component having at least one expansion port connected to the at least one controller, the expansion port connecting the at least one controller to the control component for communicating data and control signals to and from the at least one controller to the at least one I/O module, wherein the first network module control component is connected to the expansion component using a data plane connection and a separate control plane connection;
a configuration component for communicating I/O port configurations to the operating software of the control component; and
a security component for regulating access to the first control module based upon one or more security attributes.

12. The system as claimed in claim 11, wherein the operating software includes a plurality of pre-programmed operating configurations, the first control network module further comprising:
a mode component for selecting one of the pre-programmed operating configurations.

13. The system as claimed in claim 12, wherein the system further comprises:
a system connectivity port connected to the control component, the system connectivity port connecting the control component to a supervising controller of the industrial distributed control system for communicating status notifications from the first control network module to the industrial distributed control system.

14. The system as claimed in claim 11, wherein the configuration component includes a wireless communication module that operates using a wireless communication protocol to receive I/O port configurations from the at least one I/O port and the at least one expansion port and to load port configurations to the operating software from a remotely located communication device.

15. The system as claimed in claim 11, wherein data signals are passed between the control component and the expansion components using the data plane connection and control signals are passed between the control component and expansion component along the control plane connection.

16. The system as claimed in claim 15, wherein the system further includes a second control network module connected to the first control network module, the control component of the first control network module interconnected to the control component of the second control network module using the data plane connection and the control plane connection;
wherein the first control network module and the second control network module operate synchronously providing similar I/O port and expansion port configurations between the at least one I/O port and the at least one expansion port of the first network module and the at least one I/O port and the at least one expansion port of the second control network module.

17. The system as claimed in claim 15, wherein the expansion component of the first control network module is connected to the expansion component of a second control network module using the data plane connection and the control plane connection; wherein the expansion component of the second control network module operates in a passive role to expand the at least one expansion port of the first control network module to additional expansion ports at the second control network module.

18. The system as claimed in claim 17, wherein the second control network module includes a security component connected to the control component of the first network module, wherein the security component of the second network module regulates access to the additional expansion ports of the second control network module based upon one or more security attributes.

19. The system as claimed in claim 15, wherein the system further includes a second control network module connected to the first second control network module, the control component of the first control network module interconnected to the control component of the second control network module using the control plane connection;
    wherein the first control network module and the second control network module operate independently of the other sharing at least one of configuration, messaging and control information between the first control network module and the second control network module.

* * * * *